United States Patent [19]

Pedain et al.

[11] Patent Number: 4,980,500
[45] Date of Patent: Dec. 25, 1990

[54] PROCESS FOR THE PREPARATION OF BIURET POLYISOCYANATES, THE COMPOUNDS OBTAINED BY THIS PROCESS AND THEIR USE

[75] Inventors: Josef Pedain, Cologne; Manfred Schönfelder, Leverkusen; Manfred Schmidt, Dormagen, all of Fed. Rep. of Germany

[73] Assignee: Bayer Aktiengesellschaft, Leverkusen, Fed. Rep. of Germany

[21] Appl. No.: 281,159

[22] Filed: Dec. 7, 1988

[30] Foreign Application Priority Data

Dec. 12, 1987 [DE]  Fed. Rep. of Germany ....... 3742181

[51] Int. Cl.$^5$ .................... C07C 261/00; C07C 69/76; C07C 69/74
[52] U.S. Cl. .................... 560/158; 560/159; 560/90; 560/127; 252/182.2
[58] Field of Search ................ 560/335, 351, 90, 127, 560/198, 158, 159; 252/182.2

[56] References Cited

U.S. PATENT DOCUMENTS

| | | | |
|---|---|---|---|
| 3,124,605 | 3/1964 | Wagner | 260/453 |
| 3,350,438 | 10/1967 | Hennig et al. | 260/453 |
| 3,367,956 | 2/1968 | Hennig et al. | 260/453 |
| 3,441,588 | 4/1969 | Wagner et al. | 260/453 |
| 3,462,470 | 8/1960 | Emery | 260/453 |
| 3,526,652 | 9/1970 | Powers | 260/453 |
| 3,824,266 | 7/1974 | Dietrich et al. | 260/453 |
| 3,862,973 | 1/1975 | Dietrich et al. | 260/453 |
| 3,896,154 | 7/1975 | Takahashi et al. | 260/453 |
| 3,903,126 | 9/1975 | Woerner et al. | 260/453 |
| 3,954,825 | 5/1976 | Touhey et al. | 260/453 |
| 3,976,622 | 8/1976 | Wagner et al. | 260/77.5 |
| 4,051,165 | 9/1977 | Wagner | 260/453 |
| 4,147,714 | 4/1979 | Hetzel et al. | 260/453 |
| 4,176,132 | 11/1979 | Ide et al. | 260/453 |
| 4,192,936 | 3/1980 | Mohring et al. | 528/59 |
| 4,218,390 | 8/1980 | Brusilovsky et al. | 260/453 |
| 4,264,519 | 4/1981 | Hennig et al. | 260/453 |
| 4,290,969 | 9/1981 | Komatsu | 260/453 |
| 4,292,255 | 9/1981 | Hennig et al. | 260/453 |
| 4,320,068 | 3/1982 | Schwindt et al. | 260/453 |
| 4,355,138 | 10/1982 | Markusch et al. | 525/127 |
| 4,419,293 | 12/1983 | Hudson et al. | 260/453 |
| 4,613,686 | 9/1986 | Konig et al. | 560/335 |
| 4,625,052 | 11/1986 | Konig et al. | 560/335 |
| 4,837,359 | 6/1987 | Woynar et al. | 560/335 |

FOREIGN PATENT DOCUMENTS

| | | |
|---|---|---|
| 883504 | 6/1953 | Fed. Rep. of Germany . |
| 1507632 | 10/1973 | Fed. Rep. of Germany . |
| 140744 | 3/1980 | Fed. Rep. of Germany . |
| 50-16356 | 12/1975 | Japan .................... 560/351 |
| 1043672 | 9/1966 | United Kingdom . |
| 1044932 | 10/1966 | United Kingdom . |
| 1263609 | 2/1972 | United Kingdom . |
| 14606851 | 1/1977 | United Kingdom . |
| 889050 | 2/1982 | United Kingdom . |

OTHER PUBLICATIONS

"Lackunstharze", by Hans Wagner and Hans Friedrich Sarx, 1971, pp. 153–173.
Agnew. Chem. 72, pp. 1002 et seq.

Primary Examiner—Alan Siegel
Attorney, Agent, or Firm—Joseph C. Gil; Thomas W. Roy

[57] ABSTRACT

The present invention is directed to a process for the preparation of urethane-modified biuret polyisocyanates by the reaction of (a) 1,6-diisocyanatohexane with subequivalent quantities of (b) biuretizing agents based on water and/or organic compounds which react with isocyanate groups to form biuret groups, to form biurets followed by removal of the unreacted, excess 1,6-diisocyanatohexane and any volatile components present, characterized in that at any stage before removal of the excess 1,6-diisocyanate, (c) at least one diol containing ester groups and having an average molecular weight of about 350 to 950 is added to the reaction mixture in a quantity of about 1 to 50% by weight, based on the weight of the 1,6-diisocyanatohexane, the diol reacting with part of the isocyanate groups present to form urethane groups.

The invention is also directed to the urethane-modified biuret polyisocyanates obtained by this process and their use as polyisocyanate components in two-component polyurethane lacquers.

12 Claims, No Drawings

PROCESS FOR THE PREPARATION OF BIURET POLYISOCYANATES, THE COMPOUNDS OBTAINED BY THIS PROCESS AND THEIR USE

BACKGROUND OF THE INVENTION

1. Field of the Invention

The present invention relates to a new process for the preparation of biuret polyisocyanates, to the compounds obtained by this process and to their use as polyisocyanate components in two-component polyurethane lacquers.

2. Description of the Prior Art

Aliphatic polyisocyanates, in particular biuret polyisocyanates based on 1,6-diisocyanatohexane, have achieved a position of great technical importance for the preparation of light fast and extremely weather resistant lacquers with maximum gloss retention. They are used in combination with hydroxyl group-containing polyesters or polyacrylates. These two-component polyurethane lacquers are used predominantly for lacquering relatively rigid substrates such as metals and wood and are distinguished by their great hardness and very firm adherence.

The chemical basis for these lacquers and coatings is described inter alia in "Lackunstharze" by Hans Wagner and Hans Friedrich Sarx, Carl Hanser Verlag, Munich 1971, pages 153 to 173.

The preparation of biuret polyisocyanates, i.e. the reaction of diisocyanates such as, in particular, 1,6-diisocyanatohexane with biuretizing agents, has been disclosed in numerous prior publications. The following are examples of processes described in the literature:

Synthesis from diisocyanates and water, optionally in the presence of catalysts; see DE-PS 1,110,394, DE-OS 1,668,377, DE-OS 2,308,015, GB-PS 889,050, GB-PS 1,399,228 and DD-PS 140,744, Synthesis from diisocyanates and water in the presence of a solvent or solvent mixture, see DE-OS 2,808,801 and DE-OS 3,030,655;

Synthesis from diisocyanates and water, the water being reacted in the form of steam, see DE-OS 2,918,739;

Synthesis from diisocyanates and amines, see DE-PS 1,165,580, DE-PS 1,174,759, DE-OS 1,568,017, DE-OS 1,963,190, DE-OS 2,010,887, DE-OS 2,261,065, DE-AS 2,438,258, US-P 3,824,266, DE-AS 2,609,995, DE-OS 2,830,103, DE-PS 883,504, GB-PS 1,263,609, see also Angew. Chem. 72, page 1002;

Synthesis from diisocyanates and amine/alcohol mixtures, see DE-OS 2,654,745;

Synthesis from diisocyanates and $\omega,\omega'$-diaminopolyethers, see DE-OS 1,570,632 and DE-AS 1,215,365;

Synthesis from diisocyanates and substituted ureas, see DE-PS 1,101,394 and DE-AS 1,227,004;

Synthesis from diisocyanates and tertiary alcohols, optionally in the presence of catalysts, see DE-AS 1,543,178, DE-AS 1,931,055 and DE-OS 2,308,015;

Synthesis from diisocyanates and formic acid, see DE-PS 1,174,760, DE-OS 2,308,015 and DE-OS 2,437,130;

Synthesis from diisocyanates and aldoximes, see DE-OS 3,007,679;

Synthesis from diisocyanates and trisubstituted acetic acids and/or anhydrides and optionally water, see DE-OS 3,403,277 and 3,403,278;

Synthesis from diisocyanates and diamines using special smooth jet nozzles for the preparation of the reaction mixture, see EP-A-3505;

Use of 1,6-diisocyanatohexane in combination with (cyclo)aliphatic diamines, optionally with the addition of low molecular weight polyhydroxyl compounds (molecular weight below 500) at reaction temperatures above 250° C., see earlier German Patent Application P 37 00 209.0.

The two-component polyurethane lacquers known in the art often result in highly cross-linked lacquer coats which have insufficient elasticity for flexible substrates. In the motor car industry in particular flexible plastic parts are increasingly used for improved safety. These flexible molded parts (bumpers, spoilers, frames for outside mirrors, and the like) are relatively large and therefore contribute considerably to the external appearance of the vehicle. It is therefore necessary to lacquer these parts. Added to this is the fact that the surfaces of the plastics are deteriorated by the weather and must therefore be protected. Elastic lacquerings are also required for less elastic plastic parts to prevent mechanical damage to the parts. For example, hard but tough thermoplasts must be lacquered with highly elastic, extremely resistant lacquers so that mechanical damage or other external influences will not produce cracks in the lacquer film which would be propagated into the compact plastic. The lacquers for such parts, especially the top coat lacquers, must therefore conform to standards much higher than those required for ordinary lacquers.

A partial solution to these problems was the development of hydroxyl-polyesters and polyacrylates which can be worked up into elastic lacquer films by virtue of their structure. It was not possible to overcome all of the difficulties by these means. The lacquer films produced are in many cases not sufficiently hard and not sufficiently cross-linked and/or have too little chemical resistance.

It was therefore an object of the present invention to provide new polyisocyanates which when combined with known polyols to form two-component polyurethane lacquers would satisfy the above-mentioned special requirements and would in particular be optimally suited for lacquering elastic plastic parts.

This problem has been solved by providing the process according to the invention described below for the preparation of urethane-modified biuret polyisocyanates.

SUMMARY OF THE INVENTION

The present invention is directed to a process for the preparation of urethane-modified biuret polyisocyanates by the reaction of (a) 1,6-diisocyanatohexane with subequivalent quantities of (b) biuretizing agents based on water and/or organic compounds which react with isocyanate groups to form biuret groups, to form biurets followed by removal of the unreacted, excess 1,6-diisocyanatohexane and any volatile components present, characterized in that at any stage before removal of the excess 1,6-diisocyanate, (c) at least one diol containing ester groups and having an average molecular weight of about 350 to 950 is added to the reaction mixture in a quantity of about 1 to 50% by weight, based on the weight of the 1,6-diisocyanatohexane, the diol reacting with part of the isocyanate groups present to form urethane groups, provided that when cycloaliphatic or aliphatic diamines are used as biuretizing agents and temperatures above 250° C. are employed during the biuretizing reaction, the molecular weight of the polyester diols is greater than 500, and in all variations of the process the nature and quantitative proportions of the reactants are chosen so that (i) the reaction mixture excluding any inert solvents still contains at least 10% by weight of free 1,6-diisocyanatohexane after the reaction and before removing unreacted diisocyanate, and (ii) the molar ratio of biuret groups to urethane groups in the products of the process is about 20:1 to 0.2:1.

The invention is also directed to the urethane-modified biuret polyisocyanates obtained by this process and their use as polyisocyanate components in two-component polyurethane lacquers.

DETAILED DESCRIPTION OF THE INVENTION

The process according to the invention may be carried out in the same way as prior art processes with the only difference that in the process according to the invention special polyester diols (c) are used in addition to the starting diisocyanate (a) (1,6-diisocyanatohexane) and the biuretizing agents (b).

The process according to the invention may therefore be carried out with any known biuretizing agents (b). 1,6-diaminohexane and t-butanol are disclosed in DE-OS 3,403,277 and 3,403,278 (U.S. Pat. Nos. 4,613,686 and 4,625,052, respectively, both of which are herein incorporated by reference) are particularly preferred, i.e. (b1) 2,2,2-trisubstituted acetic acids, in particular trimethyl acetic acid, (b2) mixtures thereof with water in a molar ratio of trisubstituted acetic acid, in particular trimethyl acetic acid, to water of 1.0:0 to 1.0:2.5 and (b3) water mixed with 2,2,2-trisubstituted acetic acids, in particular trimethyl acetic acid, and/or with anhydrides of such acids, using up to 0.39 moles of acid and/or up to 2 moles of anhydride per mole of water, under the condition that the total quantity of acids and of anhydride is at least 0.02 moles and not more than 2 moles per mole of water.

The polyester diols (c) used in the process according to the invention have an average molecular weight, calculated from the hydroxyl number, of about 350 to 950, preferably about 500 to 800. They are known polyester diols synthesized from diols and dicarboxylic acids. Examples of suitable diols for the preparation of the polyester diols include dimethylolcyclohexane, ethane diol, 1,2- and 1,3-propane diol, 1,2-, 1,3- and 1,4-butane diol and especially 1,6-hexane diol. Suitable dicarboxylic acids include aromatic dicarboxylic acids such as phthalic acid, isophthalic dicarboxylic acid and terephthalic acid; cycloaliphatic acids such as hexahydrophthalic acid, tetrahydrophthalic acid, endomethylenetetrahydrophthalic acid and their anhydrides; and preferably aliphatic dicarboxylic acids such as succinic acid, glutaric acid, adipic acid, suberic acid, azelaic acid, sebacic acid and their anhydrides. Any mixtures of such polyester diols may also be used.

It is preferred, however, to use polyester diols of ε-caprolactone in the above-mentioned molecular weight range. These may be prepared in known manner from a diol of the type exemplified above as a starter molecule and ε-caprolactone. The starter molecule used is preferably 1,6-hexane diol.

ε-caprolactone diols which have been started on 1,6-hexane diol and have a very narrow oligomer distribution are particularly preferred as component (c). This narrow distribution may be achieved by using boron trifluoride etherate or organic tin compounds as catalysts for the polymerization. These particularly preferred ester diols contain more than 50% by weight of molecules in the molecular weight range of 460 to 802.

The starting compounds (a), (b) and (c) may be reacted in any desired sequence, provided the reaction with component (c) (urethane formation) is carried out before removal of the excess starting diisocyanate (a). This means that the reaction for urethanization may be carried out in a separate step before or after biuretization and/or it may be carried out simultaneously with the biuretization reaction. In practice, this means that component (c) may first be reacted with component (a) to bring about urethanization of some of the isocyanate groups of component (a); alternatively, the reaction with biuretizing agent may first be carried out and component (c) may then be added to the resulting mixture of excess starting diisocyanate (a) and biuret polyisocyanate to bring about partial urethanization of the isocyanate groups present in the mixture which is in the form of a solution: or, as yet another possibility, the starting diisocyanate (a) may be reacted with a mixture of biuretizing agent (b) and polyester diol (c). Component (c) may, of course, be divided into several parts and each part may be added separately before, during and/or after the biuretization reaction to bring about urethanization of part of the isocyanate groups present.

As for the choice of the quantitative proportions of the individual reactants, it is preferable to ensure that 1,6-diisocyanatohexane (a) is always introduced in such an excess that at the end of the reaction the reaction mixture still contains at least 10% by weight, preferably about 35 to 70% by weight of free 1,6-diisocyanatohexane, based on the total quantity of mixture not including any inert solvents used, the quantity of biuretizing agent (b) is kept low enough that not more than 50 mole %, preferably about 10 to 30 mole % of the isocyanate groups of 1,6-diisocyanatohexane (a) undergo reaction to form biuret groups, the calculation being based on the assumption 15 that the products of the biuretization reaction are entirely N,N',N''-trisubstituted biurets and the molar ratio of biuret groups to urethane groups in the products of the process is about 20:1 to 0.2:1, preferably about 5:1 to 0.5:1.

The polyester diol (c) is generally used in a proportion of about 1 to 50% by weight, preferably about to 40% by weight, based on the quantity of 1,6-diisocyanatohexane (a) used in the process. When the particularly preferred biuretizing agents (b) mentioned above are used in the process, the molar ratio of isocyanate groups to (potential) water is preferably about 40:1 to 6:1 (2 mole of trisubstituted acetic acid, i.e., "potential water", corresponding to one mole of water).

The process according to the invention is generally carried out within the temperature range of about 20° to 180° C. The urethanization reaction is preferably carried out at temperatures from about 20° to 150° C., in particular about 80° to 130° C., biuretization reaction is preferably carried out at temperatures from about 80° to 180° C., in particular about 0° to 130° C.

There are several variations by which the process according to the invention may be carried out. However, the process is preferably carried out by introducing starting component (a), i.e. 1,6-diisocyanatohexane into the reaction vessel and gradually adding components (b) and (c) in any sequence (as indicated above) at the given reaction temperature and intimately mixing them with the diisocyanate present. The process may also be carried out by a procedure analogous to that described in EP-A-3505 (U.S. Pat. Nos. 4,264,519 and 4,292,255, both of which are incorporated by reference), i.e., 1,6-diaminohexane may be used as biuretizing agent (b) and the diisocyanate component (a), which may already have been urethanized by the reaction with component (c), may be introduced into the mixing chamber described in the reference. The diamine component, which is used in subequivalent amount, may then be introduced into the diisocyanate by means of the smooth jet nozzle described in the reference under conditions of pressure and relative velocity stipulated therein. In this case, there is, of course, also the choice of carrying out urethanization either simultaneously with or after biuretization.

Biuret formation may also be carried out by the known two-stage method (two-stage temperature control) via urea formation in an intermediate stage as described, for example, in EP-A-3505, DE-PS-1,165,580, DE-PS 1,174,759, DE-OS 1,568,017, DE-OS 1,963,190, DE-OS 2,010,887, DE-OS 2,261,065, DE-AS 2,438,258, US-P 3,824,266, DE-AS 2,609,995, DE-OS 2,803,103, DE-PS 883,504, GB-PS 1,263,609 or Angew. Chem. 72, page 1002.

The process according to the invention may advantageously be carried out in the presence of an inert solvent, for example, an ether such as diisopropyl ether, ethylene glycol dimethyl ether, diethylene glycol dimethyl ether, 1,4-dioxane, tetrahydrofuran or 1,2-dimethoxy propane; an ester such as butyrolactone, ethylene glycol carbonate or propylene glycol carbonate; an ether ester such as methoxyethyl acetate, ethoxyethyl acetate, 1-methoxypropyl-2-acetate, 2-methoxypropyl-1-acetate, 1-ethoxypropyl-2-acetate or 2-ethoxypropyl-1-acetate; ketones such as acetone or methylethyl ketone; nitriles such as acetonitrile, propionitrile or methoxypropionitrile; sulphones such as sulpholan, dimethylsulphone or diethylsulphone: and phosphoric acid esters such as trimethyl phosphate or triethyl phosphate. The process may also be carried out without such solvents.

After urethanization and biuretization have been completed, the excess diisocyanate and any by-products formed and solvents used are removed by suitable means down to a residual starting diisocyanate content of not more than 0.5% by weight. This may be achieved by thin layer distillation or extraction, for example using n-hexane as the extracting agent.

The products according to the invention containing urethane and biuret groups are liquid, virtually colorless polyisocyanates with an isocyanate content of about 8 to about 20%. They are soluble in the solvents such as esters, ketones and hydrocarbons and may be diluted with these solvents without cloudiness. The products are distinguished by their good storage stability and are substantially free from by-products. They are eminently suitable as hardeners in two-component lacquers for the production of polyisocyanate polyaddition products, preferably polyurethanes. The second component is base on compounds containing at least two isocyanate-reactive groups such as hydroxyl groups or amino groups. Examples include polyether polyols, polyester polyols and/or polyacrylate polyols as polyhydroxyl compounds serving as reactants for the polyisocyanates. Particularly preferred reactants for the products according to the invention are polyacrylates containing hydroxyl groups, i.e. polymers or copolymers of (meth-)acrylic acid alkyl esters, optionally with styrene or other copolymerizable, olefinically unsaturated monomers.

The two-component polyurethane lacquers used as binders which contain combinations of such polyhydroxyl compounds and the products according to the invention as hardeners may, of course, also contain auxiliary agents and additives used in lacquer technology such as pigments, leveling agents, catalysts, solvents and the like. The two-component polyurethane lacquers which contain the products according to the invention as hardeners harden at room temperature or slightly elevated temperature to form chemically resistant lacquer films.

The products according to the invention may, of course, also be blocked with blocking agents to serve as hardeners in one-component lacquers which can be cross-linked by heat. Suitable blocking agents for this purpose include phenol, cresols, trimethyl phenols and tert.-butyl phenols; tertiary alcohols such as tert.-butanol, tert.-amyl alcohol and dimethylphenylcarbinol: compounds which readily form enols such as ethyl acetate, acetyl acetone and malonic acid derivatives such as malonic acid diesters containing 1 to 8 carbon atoms in the alcohol groups: secondary aromatic amines such as N-methylaniline, N-methyltoluidines, N-phenyltoluidine and N-phenylxylidine; imides such as succinimide; lactams such as $\epsilon$-caprolactam and $\delta$-valerolactam; oximes such as butanone oxime and cyclohexanone oxime; mercaptans such as methylmercaptan, ethylmercaptan, butylmercaptan, 2-mercaptobenzothiazole, $\alpha$-napthylmercaptan and dodecylmercaptan: and triazoles such as 1H-1,2,4-triazole.

The products according to the invention may also be combined with polyamines which have blocked amino groups, e.g. with polyketimines, polyaldimines or oxazoladines. Free amino groups are formed under the influence of moisture and (in the case of oxazoladines) also free OH groups which react with isocyanate groups with cross-linking.

In the lacquer combinations mentioned above, the polyisocyanate components and their reactants are present in such quantities that about 0.8 to 3, preferably about 0.9 to 1.8 (optionally blocked) isocyanate reactive groups are present for each (optionally blocked) isocyanate group.

The coating compounds containing the products according to the invention are hardeners, optionally in a blocked form, are suitable for coating any substrates. They are distinguished from analogous coating compounds which contain conventional biuret polyisocyanates as hardeners by the increased flexibility of the coating. The particularly preferred field of application for the products according to the invention is in their use as hardeners for two-component synthetic resin lacquers based on the polyhydroxyl compounds exemplified above, in particular for lacquering flexible plastic parts.

All percentages and parts given in the following examples are percentages by weight unless otherwise indicated.

EXAMPLES

Example 1

(Preparation of a Diol)

A melt was prepared from 2920 parts by weight of adipic acid, 2910 parts by weight of neopentyl glycol and 470 parts by weight of hexane-1,6-diol at 120° to 140° C. The temperature was then slowly raised to 180° C. over a period of about 12 hours, during which water was distilled off. The melt was kept at 200° C. for about 2 hours. 0.03 parts by weight of $SnCl_2.2H_2O$ were added as catalyst, a vacuum was applied and the reaction mixture was heated to 180–200° C. for about 15 hours.

A liquid, pale yellow polyester having the following data was obtained:

OH number: 225 (calculated 241).
Acid number: 1
Average molecular weight (calculated from the hydroxyl number): 498.

Example 2

(Preparation of a Diol)

57.3 kg of ε-caprolactone, 12.7 kg of hexane-1,6-diol and 3.5 g of tin-II octoate were mixed together in a 100 liter vessel which had been flushed with nitrogen and the reaction mixture was heated to 160° C. The reaction was completed after 4 hours at 160° C. The product (70 kg) which was liquid at room temperature was discharged on cooling.

Data of the Diol:

$\eta 25°$ C.: 330 mPas.
OH number: 172.4.
Acid number: 0.6.
Color number (HAZEN) according to DIN 53 409: 30.
Average molecular weight (calculated from OH number): 650.

Analysis by gel chromatography shows the following oligomer distribution of the polyester:

| Oligomer Molecular Weight | Experimentally (Surface area % - Weight %) |
| --- | --- |
| 118 | 0.15 |
| 232 | 1.75 |
| 346 | 5.76 |
| 460 | 11.44 |
| 574 | 15.92 |
| 688 | 19.19 |
| 802 | 15.62 |
| 916 | 12.08 |
| 1030 | 8.15 |
| 1144 | 5.25 |
| >1144 | 4.69 |

Results: more than 50% by weight of the molecules present in the polyester were in the molecular weight range of 460 to 802.

Example 3

(Preparation of a polyisocyanate according to the invention)

2100 g of 1,6-diisocyanatohexane (HDI) were mixed with 250 g of the polyester from Example 1, heated to 80–100° C. and kept at this temperature until the NCO value had fallen to the theoretical value of 42.9% or slightly below it (after 2 to 3 hours). 100 g of triethyl phosphate and 33.8 g of pivalic acid anhydride were then added and the reaction mixture was heated to 110° C. 4.1 g of pivalic acid and 17.3 g of water were simultaneously added dropwise from separate containers at this temperature within 1 hour. Vigorous evolution of $CO_2$ began without the formation of a precipitate. Stirring was continued for 2 hours at 120° C. after all the pivalic acid and water had been added. The isocyanate value was 0.5 to 1% less than the calculated value of 35.8%. The clear product formed was freed from monomers and solvent by means of a molecular evaporator. 1035 g of a colorless, liquid resin were obtained.

Data of the resulting polyisocyanate:
NCO content: 16.8%.
Viscosity: 4500 mPas.
Color number (HAZEN) according to DIN 53 409: 20.

Example 4

(Preparation of a polyisocyanate according to the invention)

The procedure was as described in Example 3 and the polyisocyanate was prepared from the following components:

2184 g 1,6-diisocyanatohexane
660 g diol from Example 2
100 g triethyl phosphate
33.8 g pivalic acid anhydride
4.1 g pivalic acid
17.3 g water.

1429 g of a colorless, low viscosity polyisocyanate having the following data were obtained:

NCO content: 12.7%.
Viscosity: 3000 mPas.
Color number (HAZEN) according to DIN 53 409: 15.

Example 5

(Preparation of a polyisocyanate according to the invention)

The procedure was as described in Example 4, using the same components in the same proportions, but in this case the polyester diol from Example 2 was introduced into the reaction mixture during the biuretization reaction together with the pivalic acid. A product having the following data was obtained after the removal of excess diisocyanate and solvent:

NCO: 12.5%.
Viscosity: 2900 mPas.
Color number (HAZEN) according to DIN 53 409: 15.
Free HDI content: 0.05%.

Example 6

Preparation of a polyisocyanate according to the invention)

A polyisocyanate was prepared from the same components in the same proportions as in Example 4. In contrast to Example 4, however, the diol was added only after biuretization had been completed and urethanization was carried out at 80° to 100° C. until the isocyanate content was 30.4%. Thereafter excess diisocyanate and solvent were removed by distillation.

Data of the resulting polyisocyanate:

NCO 12.3%.
Viscosity: 3100 mPas.

Color number (HAZEN) according to DIN 53 409: 20.

Free HDI content: 0.05%.

The products obtained according to Examples 4, 5 and 6 were virtually identical in the physical properties and also in the chemical properties. Like the polyisocyanate from Example 3, they remained clear and without phase separation or cloudiness when left to stand for an extended period of ambient temperature and 0° C.

Example 7

(Comparison experiment to Example 3 not according to the invention)

This example demonstrates that subsequent modification of a biuret polyisocyanate with a diol does not result in a technically usable product.

The procedure was as indicated in Example 3. A biuret polyisocyanate was prepared from the same quantities of HDI, water, pivalic acid anhydride and pivalic acid in triethyl phosphate as solvent and was then separated from unreacted diisocyanate by thin layer distillation. 430 g of a liquid biuret polyisocyanate (7a) having an isocyanate content of 24% were obtained. 250 g of the polyester from Example 1 were then added and the reaction mixture was stirred at 80° C. The mixture gelled after 15 minutes.

In another experiment, 250 g of from Example 1 were reacted with 504 g of HDI at 80° C. until the isocyanate content was equal to or slightly below the calculated NCO content of 27.8%. Excess HDI was then removed by distillation. 297 g of a liquid resin with an isocyanate content of 9.8% was obtained. This resin was clear when warm but became cloudy when left to stand and cool.

This urethane resin (7b) was then mixed with the pure biuret resin (7a) in proportions by weight of 430:397, i.e., the polyisocyanate resin prepared before the addition of the polyester from Example 1.

The resulting polyisocyanate (7c) containing biuret and urethane groups had an isocyanate content of 17.2% and was clear and transparent during heating and after mixing. When left to stand for several days at about 23° C., a cloudy deposit separated such that the product could not be worked up into a high gloss lacquer with good mechanical properties. The polyisocyanates according to the invention described in Examples 3 to 6 remained completely clear when stored under the same conditions.

Example 8

(Example of use)

Two polyisocyanates according to the invention from Example 3 and Example 4 and a prior art polyisocyanate were used to prepare mixtures with a hydroxyl polyacrylate to serve as lacquer binders for coating an elastic synthetic resin material.

The hydroxy polyacrylate used was a 65% solution in xylene of a copolymer of 18% by weight of styrene, 26% by weight of hydroxyethyl acetate, 55% by weight of butyl acrylate and 1% by weight of acrylic acid. The solution has a hydroxyl number of 72, an acid number of 5.9 and a viscosity of 2300 mPas/23° C.

A commercial polyisocyanate containing biuret groups and based on HDI was used as the comparison isocyanate in the form of a 75% solution in xylene/methoxypropyl acetate. The solution had an isocyanate content of 16.5% by weight.

The mixtures are used for lacquering boards of a semi-rigid, elastic PUR integral foam plastic. The boards had been pretreated with a primer.

The mixtures of polyisocyanate and hydroxyl component were prepared in an NCO/OH ratio of 1:1. A TiO$_2$ pigment (of the Rutile type) was previously incorporated in the hydroxyl component in the usual manner in a three roll mixer. The ratio by weight of organic binder to pigment was 1.5 in the lacquer ready for spraying. 0.3% by weight (based on the binder) of diazabicyclooctane were added as catalyst.

The mixtures were adjusted to an outflow time (DIN 53 211, 4 mm) of about 18 seconds by the addition of solvents. The processing time available for these lacquers ready for spraying was about 30 hours in a closed vessel. The lacquers were sprayed on plastic plates and their properties were examined. The results are summarized in the table. Adherence, gloss and impact elasticity of the lacquer films were not given. They were in all cases at a very high level.

| Test | Lacquer Containing Comparison Polyisocyanate | Lacquer Containing Polyisocyanate from Example 3 | Lacquer Containing Polyisocyanate from Example 4 |
|---|---|---|---|
| Pendulum hardness (s) | | | |
| after 45 min/80° C. | 29 | 22 | 27 |
| 7 days/approx. 23° C. | 109 | 101 | 30 |
| 14 days/approx. 23° C. | 115 | 105 | 63 |
| 14 days/approx. 23° C. + 30 min 80° C. | 115 | 108 | 70 |
| Solvent attack after storage of the lacquer film for 45 min at 80° C. and 14 days at about 23° C. (1) | | | |
| Toluene | 2 | 2 | 1–2 |
| Methoxypropyl acetate | 1–2 | 1–2 | 1 |
| Ethyl acetate | 2–3 | 2–3 | 3 |
| Acetone | 3 | 2–3 | 2–3 |
| Buckling test at various tempertaures/1 inch (= 2.54 cm) (2) | | | |
| +20° C. | + | + | + |
| + 5° C. | + | + | + |
| 0° C. | 0 | + | + |
| − 5° C. | − | + | + |
| −10° C. | − | + | + |
| −15° C. | − | + | + |
| −20° C. | − | + | + |
| −40° C. | − | − | + |

Legend to the table:
(1)Solvent attack of the lacquer films was assessed after 1 minute of contact with solvent. Damage of the lacquer film was assessed in 6 stages ranging from 0 (lacquer film completely unchanged) to 5 (laquer film dissolved).
(2)The buckling test was carried out with PUR plastic plates. After the lacquer had been sprayed on the plates which had been lightly rubbed down and primed, the plates were briefly exposed to air, then stoved for 45 minutes at 80° C. and aged for 1 week at about 23° C.. The samples were then cut up into strips 2 cm in width which are stored at the measuring temperatures for about 30 minutes. These strips were then bent over a 1 inch mandrel which had also been adjusted to the given measuring temperature. Testing was also carried out at the given measuring temperature (in the refrigerator). Assessment of samples:
+:film in order
0:onset of cracking
−:cracked.

SUMMARY OF RESULTS

The lacquer polyisocyanates according to the invention were distinguished from the state of the art in that the lacquer films obtained have greater elasticity, especially greater flexural elasticity, at low temperatures.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a urethane-modified biuret polyisocyanate which comprises
   (a) 1,6-diisocyanatohexane with subequivalent quantities of
   (b) a biuretizing agent comprising water and/or an organic compound which reacts with isocyanate groups to form biuret groups, to form biuret groups and subsequently removing unreacted excess, 1,6-diisocyanatohexane and any other volatile constituents present, the process additionally comprising adding prior to said removing step
   (c) about 1 to 50% by weight, based on the weight of said 1,6-diisocyanatohexane, of at least one diol containing ester groups and having an average molecular weight of 350 to 950 to the reaction mixture to form urethane groups, provided that when said biuretizing agent comprises a cycloaliphatic or aliphatic diamine and temperatures of greater than 250° C. are employed during the biuretizing reaction, the molecular weight of said polyester diol is above 500, the process being conducted such that
   (i) the reaction mixture contains at least 10% by weight, based on the weight of the reaction mixture excluding any inert solvents used, of unreacted 1,6-diisocyanatohexane after the reaction has been terminated and prior to said removing step and
   (ii) the molar ratio of biuret groups to urethane groups in the product is about 20:1 to 0.2:1.

2. The process of claim 1 where said biuretizing agent (b) comprises
   (1) trimethyl acetic acid,
   (2) mixtures of trimethyl acetic acid and water in a molar ratio of 1.0:0 to 1.0:2.5 or
   (3) a mixture of water with up to 0.39 moles of trimethyl acetic acid per mole of water and/or up to 2 moles of trimethyl acetic acid anhydride per mole of water, provided that the total quantity of trimethyl acetic acid and trimethyl acetic acid anhydride is at least 0.02 moles and not more than 2 moles per mole of water.

3. The process of claim 1 wherein a polyester of adipic acid is used as ester group-containing diol (c).

4. The process of claim 2 wherein a polyester of adipic acid is used as ester group-containing diol (c).

5. The process of claim 1 wherein polyester diol (c) comprises a polyester diol which has been prepared by the reaction of -caprolactone with 1,6-dihydroxyhexane wherein more than 50% by weight of said polyester diol has a molecular weight of 460 to 802.

6. The process of claim 2 wherein polyester diol (c) comprises a polyester diol which has been prepared by the reaction of -caprolactone with 1,6-dihydroxyhexane wherein more than 50% by weight of said polyester diol has a molecular weight of 460 to 802.

7. A urethane-modified biuret polyisocyanate which is prepared by a process which comprises reacting
   (a) 1,6-diisocyanatohexane with subequivalent quantities of
   (b) a biuretizing agent comprising water and/or an organic compound which reacts with isocyanate groups to form biuret groups, to form biuret groups and subsequently removing unreacted excess, 1,6-diisocyanatohexane and any other volatile constituents present, the process additionally comprising adding prior to said removing step
   (c) about 1 to 50% by weight, based on the weight of said 1,6-diisocyanatohexane, of at least one diol containing ester groups and having an average molecular weight of 350 to 950 to the reaction mixture to form urethane groups, provided that when said biuretizing agent comprises a cycloaliphatic or aliphatic diamine and temperatures of greater than 250° C. are employed during the biuretizing reaction, the molecular weight of said polyester diol is above 500, the process being conducted such that
   (i) the reaction mixture contains at least 10% by weight, based on the weight of the reaction mixture excluding any inert solvents used, of unreacted 1,6-diisocyanatohexane after the reaction has been terminated and prior to said removing step and
   (ii) the molar ratio of biuret groups to urethane groups in the product is about 20:1 to 0.2:1.

8. The polyisocyanate of claim 7 wherein said biuretizing agent (b) comprises
   (1) trimethyl acetic acid,
   (2) mixtures of trimethyl acetic acid and water in a molar ratio of 1.0:0 to 1.0:2.5 or
   (3) a mixture of water with up to 39 moles of trimethyl acetic acid per mole of water and/or up to 2 moles of trimethyl acetic acid anhydride per mole of water, provided that the total quantity of trimethyl acetic acid and trimethyl acetic acid anhydride is at least 0.02 moles and not more than 2 moles per mole of water.

9. The polyisocyanate of claim 7 wherein a polyester of adipic acid is used as ester group-containing diol (c).

10. The polyisocyanate of claim 8 wherein a polyester of adipic acid is used as ester group-containing diol (c).

11. The polyisocyanate of claim 7 wherein polyester diol (c) comprises a polyester diol which has been prepared by the reaction of -caprolactone with 1,6-dihydroxyhexane wherein more than 50% by weight of said polyester diol has a molecular weight of 460 to 802.

12. The polyisocyanate of claim 8 wherein polyester diol (c) comprises a polyester diol which has been prepared by the reaction of -caprolactone with 1,6-dihydroxyhexane wherein more than 50% by weight of said polyester diol has a molecular weight of 460 to 802.

* * * * *

UNITED STATES PATENT AND TRADEMARK OFFICE
CERTIFICATE OF CORRECTION

PATENT NO. : 4,980,500

DATED : December 25, 1990

INVENTOR(S) : Josef Pedain et al

It is certified that error appears in the above-identified patent and that said Letters Patent is hereby corrected as shown below:

At column 3, line 30, after "t-butanol are" and before "disclosed in", please insert --preferred biuretizing agents. The biuretizing agents--.

At column 4, line 26, please delete "solution:" and insert --solution;-- therefor.

At column 4, line 47, after "assumption", please delete "15".

At column 4, line 54, after "preferably about", please insert --10--".

At column 4, line 66, after 130°C.,", please insert --while--.

At column 4, line 68, please delete "0°" and insert --80°--.

At column 8, line 36, after "15.", please insert --Free HDI content: 0.08%--.

At column 11, line 6, after "comprises", please insert --reacting--.

At column 11, line 52, please delete "-caprolactone", and insert --ξ-caprolactone-- therefor.

At column 11, line 57, please delete "-caprolactone", and insert --ξ-caprolactone-- therefor.

At column 12, line 36, please delete "39 moles", and insert --0.39 moles-- therefor.

UNITED STATES PATENT AND TRADEMARK OFFICE
CERTIFICATE OF CORRECTION

PATENT NO. : 4,980,500

DATED : December 25, 1990

INVENTOR(S) : Josef Pedain et al

It is certified that error appears in the above-identified patent and that said Letters Patent is hereby corrected as shown below:

At column 12, line 49, please delete "-caprolactone", and insert --ξ-caprolactone-- therefor.

At column 12, line 54, please delete "-caprolactone", and insert --ξ-caprolactone-- therefor.

Signed and Sealed this

Thirteenth Day of April, 1993

Attest:

STEPHEN G. KUNIN

*Attesting Officer*  *Acting Commissioner of Patents and Trademarks*